United States Patent
Zhou et al.

(10) Patent No.: US 10,061,122 B2
(45) Date of Patent: Aug. 28, 2018

(54) OPTIMIZED DESIGN METHOD FOR MANUFACTURING FRESNEL GRATING

(71) Applicant: Graduate School at Shenzhen, Tsinghua University, Shenzhen, Guangdong (CN)

(72) Inventors: Qian Zhou, Guangdong (CN); Jinchao Zhang, Guangdong (CN); Xinghui Li, Guangdong (CN); Kai Ni, Guangdong (CN); Jinchao Pang, Guangdong (CN); Haifei Hu, Guangdong (CN); Hao Dong, Guangdong (CN); Huanhuan Wang, Guangdong (CN); Xiangwen Zhu, Guangdong (CN); Lanlan Wang, Guangdong (CN)

(73) Assignee: Graduate School at Shenzhen, Tsinghua University, Shenzhen, Guangdong (CN)

( * ) Notice: Subject to any disclaimer, the term of this patent is extended or adjusted under 35 U.S.C. 154(b) by 232 days.

(21) Appl. No.: 15/216,349

(22) Filed: Jul. 21, 2016

(65) Prior Publication Data
US 2016/0327784 A1    Nov. 10, 2016

Related U.S. Application Data

(63) Continuation of application No. PCT/CN2015/091332, filed on Sep. 30, 2015.

(30) Foreign Application Priority Data

May 5, 2015   (CN) .......................... 2015 1 0225311

(51) Int. Cl.
*G02B 27/00*    (2006.01)
*G02B 5/18*     (2006.01)
*G02B 27/42*    (2006.01)

(52) U.S. Cl.
CPC ....... *G02B 27/0012* (2013.01); *G02B 5/1876* (2013.01); *G02B 27/00* (2013.01); *G02B 27/0037* (2013.01); *G02B 27/4266* (2013.01)

(58) Field of Classification Search
CPC ............... G02B 27/00; G02B 27/0012; G02B 27/0037; G02B 27/4266; G02B 5/1876
(Continued)

(56) References Cited

U.S. PATENT DOCUMENTS 6,191,889 B1 * 2/2001 Maruyama ........... G11B 7/1353
                                                    359/565
6,288,846 B1 * 9/2001 Stoner, Jr. ................ G02B 1/06
                                                    351/159.68
(Continued)

FOREIGN PATENT DOCUMENTS

CN    101246229    8/2008
CN    101487907    7/2009
(Continued)

OTHER PUBLICATIONS

Office Action issued for Chinese Patent Application No. 201510225311.2, dated Oct. 9, 2016, 7 pages.
(Continued)

*Primary Examiner* — William R Alexander
(74) *Attorney, Agent, or Firm* — Hamre, Schumann, Mueller & Larson, P.C.

(57) ABSTRACT

An optimized design method for manufacturing a Fresnel grating is disclosed, including the following steps: (1) making a Fresnel surface type of the Fresnel grating equivalent to a curved surface type, and determining, based on the curved surface type to which the Fresnel surface type is equivalent, an optical path difference function of the Fresnel grating: $\Phi(\lambda) = \langle AP_1 P_2 B \rangle - \langle AOB \rangle + Nm\lambda$; and (2) determining a Fresnel grating parameter that minimizes a func-
(Continued)

tion value of the optical path difference function, so as to manufacture a Fresnel grating that has an aberration elimination effect. The manufactured Fresnel grating may effectively eliminate a portion of aberrations of the Fresnel grating, and increase a resolution of a spectrometer.

10 Claims, 4 Drawing Sheets

(58) Field of Classification Search
USPC .......................................................... 359/571
See application file for complete search history.

(56) References Cited

U.S. PATENT DOCUMENTS

| | | | | |
|---|---|---|---|---|
| 6,344,935 B1* | 2/2002 | Maruyama | ........... | G11B 7/1353 |
| | | | | 359/719 |
| 6,480,344 B1* | 11/2002 | Maruyama | ......... | G02B 27/0037 |
| | | | | 359/571 |
| 6,487,161 B2* | 11/2002 | Maruyama | ......... | G02B 27/0037 |
| | | | | 369/112.23 |
| 6,545,807 B2* | 4/2003 | Maruyama | ........... | G11B 7/1353 |
| | | | | 359/565 |
| 6,594,222 B2* | 7/2003 | Maruyama | ........... | G11B 7/1353 |
| | | | | 369/112.26 |
| 6,597,401 B1* | 7/2003 | Maruyama | ......... | G02B 27/0018 |
| | | | | 348/272 |
| 6,741,402 B2* | 5/2004 | Takeuchi | ............... | G02B 7/028 |
| | | | | 359/570 |
| 6,760,295 B1* | 7/2004 | Maruyama | ......... | G02B 27/0037 |
| | | | | 369/112.05 |
| 6,785,203 B2* | 8/2004 | Maruyama | ........... | G11B 7/1353 |
| | | | | 369/112.23 |
| 6,804,065 B2* | 10/2004 | Kono | ..................... | B29C 33/42 |
| | | | | 359/742 |
| 7,920,456 B2* | 4/2011 | Kimura | ................ | G02B 5/1895 |
| | | | | 369/112.05 |
| 2002/0071187 A1* | 6/2002 | Kono | ..................... | B29C 33/42 |
| | | | | 359/742 |
| 2007/0127348 A1* | 6/2007 | Ooi | ......................... | G02B 3/08 |
| | | | | 369/112.02 |
| 2007/0287073 A1 | 12/2007 | Goodwin | | |
| 2012/0038918 A1* | 2/2012 | Liu | .................. | B29D 11/00269 |
| | | | | 356/328 |

FOREIGN PATENT DOCUMENTS

| | | |
|---|---|---|
| CN | 101956950 | 1/2011 |
| CN | 102868087 | 1/2013 |
| CN | 103124914 | 5/2013 |
| CN | 104880753 | 9/2015 |
| JP | 3-62001 | 3/1991 |
| JP | 2002239802 | 8/2002 |

OTHER PUBLICATIONS

Zhou, Qian, et al. "Design Method of Convex Gratings for Replicating Flat-Field Concave Gratings," Spectroscopy and Spectral Analysis. Aug. 2009, vol. 29, No. 8, pp. 2281-2285. English abstract.

Chinese Master's Theses Full-text Database, Engineering Science and Technology II [online], [retrieved on Sep. 24, 2016]. Retrieved from the Internet: <https://vpn.hw.sipo/proxy*32976325/Journal/Issue.aspx?dbCode=CMFD&PYKM=CCCM&Year=2014&Issue=03&Volume=01&Page=15>, pp. 13-21.

Yanxiu, Jiang, et al. "Design of a Varied-Line-Space Plane Grating in EUV Spectrum," ACTA OPTICA SINICA. Jan. 2015, vol. 35, No. 1, p. 0105002-1-0105002-11. English abstract.

International Search Report for PCT/CN/2015/091332, dated Jan. 20, 2016, 13 pages.

* cited by examiner

OPTIMIZED DESIGN METHOD FOR MANUFACTURING FRESNEL GRATING

BACKGROUND OF THE INVENTION

Field of the Invention

The present invention relates to an optimized design method for manufacturing a Fresnel grating.

Related Arts

In recent years, as application of a spectrometer to fields such as bio-medical, environmental monitoring and surveillance, agricultural science and technology, and industrial process monitoring is becoming wider, a conventional large spectrometers severely limits the application to these fields due to a huge volume and a bulky shape. Therefore, to develop a portable miniature spectrometer has an important realistic meaning. In the current phase, a Czerny-Turner optical system and an optical system that uses a flat field concave grating is used in a core optical splitting system with a miniature spectrum; however, the Czerny-Turner optical system uses too many optical components, including a collimating lens, a grating, and a focusing lens, and therefore the system has disadvantages such as being difficult to be installed and being poor in stability. The optical system that uses a flat field concave grating uses one optical component, that is, a concave grating, which implements functions of the collimating lens, the grating, and the focusing lens, making a huge contribution to simplify the optical system. However, the flat field concave grating has a complex manufacturing process, and is difficult to be produced in large quantities. In addition, the manufacturing difficulty for glitter in the concave grating is very high, which also limits the diffraction efficiency of the grating.

In this way, a new-type Fresnel grating optical system is put forward. A Fresnel grating is a spectrum optical splitting device that is formed by combining a Fresnel surface and a grating, and it has all roles of collimating, optical splitting, and focusing. The Fresnel grating may be a plane grating, which has a simple manufacturing process, and is easy to be produced in large quantities, so that costs of a spectrometer can be effectively reduced. However, due to complexity and multiplicity of the Fresnel surface, a difficult problem exists in optimization of a structure of the Fresnel grating.

SUMMARY OF THE INVENTION

The main objective of the present application is to provide, for a disadvantage in the prior art, an optimized design method for manufacturing a Fresnel grating, which may effectively eliminate a portion of aberrations of the Fresnel grating, and increase a resolution of a spectrometer.

To achieve the foregoing objective, the following technical solutions are used in the present application:

An optimized design method for manufacturing a Fresnel grating includes the following steps:

(1) making a Fresnel surface type of the Fresnel grating equivalent to a curved surface type, and determining, based on the curved surface type to which the Fresnel surface type is equivalent, an optical path difference function of the Fresnel grating:

$$\Phi(\lambda) = <AP_1P_2B> - <AOB> + Nm\lambda$$

wherein an A point indicates an object point, a B point indicates an image point, an O point indicates a reference origin of the grating, $P_1$ is an incidence point, on a lens surface, of a light ray of the object point, $P_2$ indicates a point at which the light ray falls on the grating, $\lambda$ indicates a wavelength, m indicates a diffraction order, N indicates a grating line distribution function, and "< >" indicates an optical path corresponding to a route; and (2) determining a Fresnel grating parameter that minimizes a function value of the optical path difference function, so as to manufacture a Fresnel grating that has an aberration elimination effect.

Further:

the curved surface type equivalent to the Fresnel surface type may be a spherical surface, and in step (1), an expression $\Phi(\lambda,x,y,z)$ of the optical path difference function of the Fresnel grating is determined according to the following formulas (4) to (10):

a direction in which a grating surface is vertical to a grating line extending direction is set to a y direction, and a grating line quantity distribution function N(y) is:

$$N(y) = N_1 y + N_2 y^2 + N_3 y^3 + N_4 y^4 + \quad (4)$$

wherein $N_1$, $N_2$, $N_3$, $N_4$, and the like, are respectively coefficients of various orders, and a group of determined coefficients correspond to a varied-line-space grating pattern, it is set that the object point A is located at a main light ray of an XOY plane, coordinates of the object point A are $(x_1,0,0)$, the image point B is also located on the XOY plane, and coordinates of the image point B are $(x_2, y_2, 0)$; and it is set that a spherical radius is R, coordinates of a sphere center $O_2$ are $(x_0,0,0)$, a refractive index inside a lens is $n_1$, and an air refractive index is $n_0$, $$<AOB> = <AO_1> + <O_1O> + <OB> = n_0(x_2-x_1) + (n_1-n_0)(R-x_0) \quad (5)$$

$$<AP_1P_2B> = <AP_1> + <P_1P_2> + <P_2B> \quad (6)$$

it is set that coordinates of P1 are $(x_3, y_3, z_3)$ and coordinates of P2 are $(0, y, z)$, and then $$<AP_1P_2B> = n_0[(x_3-x_1)^2+y_3^2+z_3^2]^{1/2} + n_1[x_3^2+(y-y_3)^2+(z-z_3)^2]^{1/2} + n_0[x_2^2+(y_2-y)^2+z^2]^{1/2} \quad (7)$$

$$(x_3-x_1)^2 + y_3^2 + z_3^2 = R^2 \quad (8)$$

$$n_0 \sin\alpha_1 = n_1 \sin\alpha_2 \quad (9)$$

$$(\vec{AP_1} \times \vec{P_1O_2}) \cdot \vec{P_1P_2} = 0 \quad (10),$$

where it indicates that an incident ray, an emergent ray, and a normal line are on a same plane, where $\vec{AP_1}$ indicates an incident ray vector, $\vec{P_1O_2}$ indicates a surface normal line vector of a curved surface, and $\vec{P_1P_2}$ indicates a refracted ray vector.

The curved surface type equivalent to the Fresnel surface type may be a spherical surface or a non-spherical surface.

The grating surface type of the Fresnel grating may be a plane grating or a curved surface grating.

The grating surface type of the Fresnel grating may be a fixed-line-space grating or a varied-line-space grating.

The Fresnel surface type of the Fresnel grating may use a concentric ring structure.

A basis for a Fresnel surface type to be equivalent to a curved surface is that when passing, at a same incident aperture angle, through the Fresnel surface and the curved surface, a same incidence point light source has a same location of image speckles and a same size of the image speckles.

In step (1), a location of the image point B is calculated according to a set location of the object point A and by using a density of central grating lines of the grating as a benchmark, and the optical path difference function is determined by using the location of the object point and the calculated location of the image point as initial conditions.

The present application has the following beneficial effects:

When a structure of a Fresnel grating is optimized according to the method in the present application, the manufactured Fresnel grating may effectively eliminate a portion of aberrations of the Fresnel grating, and conspicuously increase a resolution of a spectrometer that uses the Fresnel grating.

BRIEF DESCRIPTION OF THE DRAWINGS

The present application will become more fully understood from the detailed description given herein below for illustration only, and thus are not limitative of the present application, and where.

DETAILED DESCRIPTION OF THE APPLICATION

The following describes embodiments of the present application in detail. It should be stressed that, the following descriptions are only exemplary, but are not intended to limit the scope and application of the present application.

Figure 1:
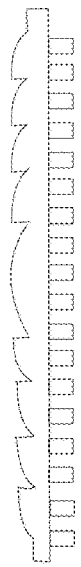
FIG. 1 is a structure of a Fresnel grating to be optimized.
Figure 2:
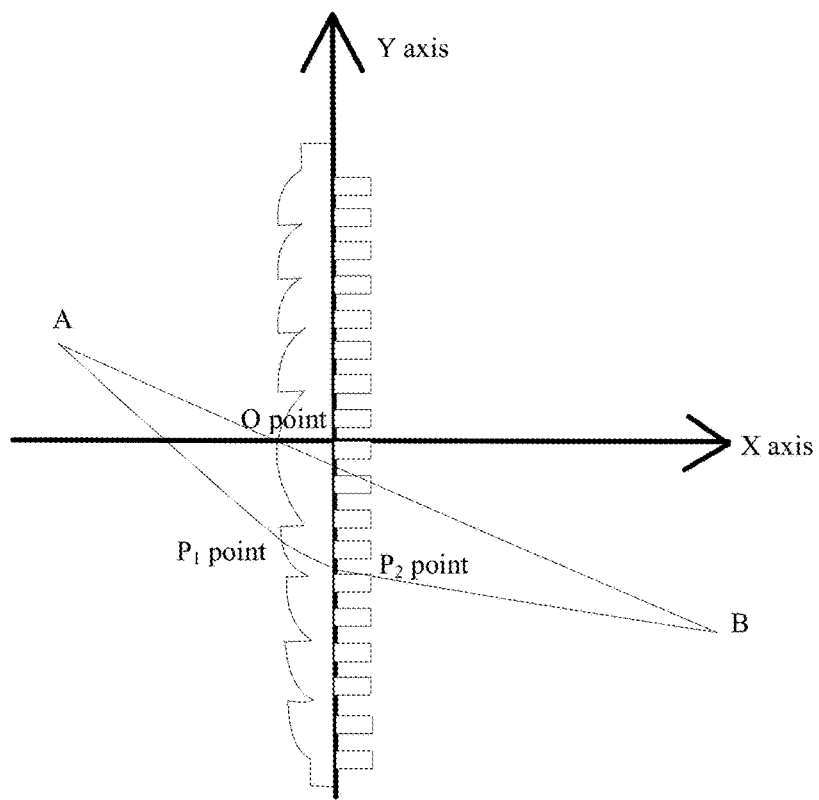
FIG. 2 is a principle diagram for optimizing a structure of a Fresnel grating by using an optimization method of a minimum optical path difference function.

An optimization method for aberration elimination of a Fresnel grating structure is shown in FIG. 2. An A point indicates a light source, a B point indicates an image point, and an 0 point indicates a reference origin of a grating. $P_2$ is any point on the grating. For a particular grating diffraction order, to make the point B an ideal image point of the point A after diffraction, according to a principle of "minimum wavelength variation", optical paths $<AP_1P_2B>$ and $<AOB>$ must meet the following relationship:

$$<AP_1P_2B> - <AOB> + Nm\lambda = 0 \quad (1)$$

wherein $\lambda$ indicates a wavelength, m indicates a diffraction order, N indicates a quantity (calculated from the reference origin) of grating lines at which the $P_2$ point is located, and "< >" indicates an optical path corresponding to a route. The (1) formula is a design basis for the Fresnel grating to implement focusing and imaging functions. However, this indicates a condition expression of ideal imaging, and for actual aberration optimization, an aberration evaluation function that can be quantified is needed. The following optical path difference function is obtained on the basis of (1):

$$\Phi(\lambda) = <AP_1P_2B> - <AOB> + Nm\lambda \quad (2)$$

A smaller absolute value of the optical path difference function indicates a smaller aberration at a focusing point, and a better focusing effect. For a determined physical layout, the optical path difference function is related to a surface type characteristic of a Fresnel surface and distribution of grating lines of a grating. Therefore, the grating line quantity N may be considered as a grating line distribution function that uses location coordinates as independent variables and that is continuously differentiable. At this time, the core of the problem lies in the Fresnel surface type, because for different Fresnel surface types, expressions of optical paths $<AP_1P_2B>$ and $<AOB>$ are different. In addition, complexity of a Fresnel surface type function causes solution of the optical paths $<AP_1P_2B>$ and $<AOB>$ to be extremely complicated. Therefore, an equivalent substitute algorithm is mentioned herein.

Figure 3A:
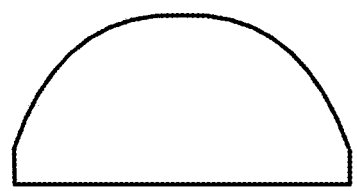
FIG. 3 (a) to FIG. 3 (c) are equivalent features of a Fresnel lens.
Figure 3B:
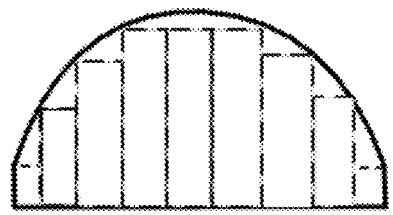
Figure 3C:
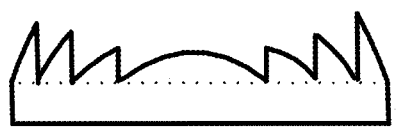

A Fresnel lens evolves on the basis of a plano convex lens. The essence of it is that a portion not affecting a variation of a lens curvature is excavated from the original lens, and only those portions that can play a role of effective refraction are kept. A formation process of it is shown in FIG. 3 (a) to FIG. 3 (c). The Fresnel lens uses a concentric ring structure, where a curvature feature of the original lens remains for each ring, and a focusing feature does not change. However, it is smaller and lighter because a portion of material is removed.

According to this feature of the Fresnel lens, the Fresnel surface may be made equivalent to a curved surface type. Therefore, in this case, a problem of optimization of the Fresnel grating structure changes to a problem of optimization of a curved surface grating structure. In this way, a difficult problem caused by the complex Fresnel surface type to the structure optimization may be avoided.

Figure 4:
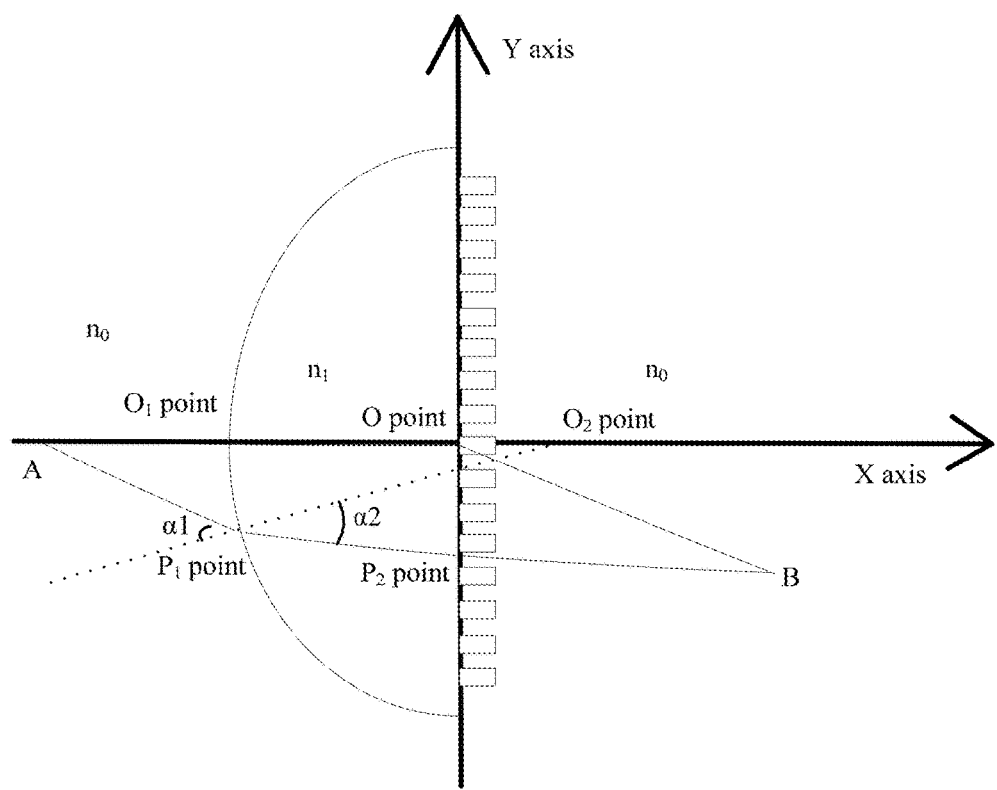
FIG. 4 is a principle diagram for optimizing a structure of a spherical surface grating by using an optimization method of a minimum optical path difference function.

The following describes the optimization method by using a spherical surface grating as an example. An optimization method for the spherical surface grating is shown in FIG. 4. An A point indicates a light source point (object point), a B point indicates an image point, and an O point indicates a reference origin of the grating. $P_2$ is any point on the grating.

Therefore, in this case, an optical path difference function of it is:

$$\Phi(\lambda) = <AP_1P_2B> - <AOB> + Nm\lambda \quad (3)$$

wherein $\lambda$ indicates a wavelength, m indicates a diffraction order, N indicates a quantity (calculated from the reference origin) of grating lines at which the $P_2$ point is located, and "< >" indicates an optical path corresponding to a route. However, in the formula, the item Nm is an equiphase focusing condition of the grating. Therefore, in the optical path difference function $\Phi(\lambda,x,y,z)$, an item is attached to offset an actual optical path difference $<AP_1P_2B> - <AOB>$.

For the varied-line-space grating, N indicates a quantity of grating lines between a central point O of the grating and any point $P_2$ on a lens surface of the grating, and a direction in which a grating surface is vertical to a grating line extending direction is set to a y direction. Therefore, a grating line quantity distribution function N(y) may be expressed as:

$$N(y) = N_1y + N_2y^2 + N_3y^3 + N_4y^4 + \quad (4),$$

wherein $N_1$, $N_2$, $N_3$, $N_4$ and the like, are respectively coefficients of various orders, and a coefficient with a higher order has less impact on a variation of a line space. A group of determined coefficients in the grating line distribution function correspond to a varied-line-space grating pattern.

It is assumed herein that, the object point A is $(x_1,0,0)$, the object point is located at a main light ray of an XOY plane, and the B point is $(x_2,y_2,0)$, that is, the image point is also located on the XOY plane. In addition, it is assumed that, a spherical radius is R, a sphere center is $O_2(x_0,0,0)$; and a refractive index inside a lens is $n_1$, outside the lens is air, and a refractive index of it is $n_0$. Therefore, $$<AOB> = <AO_1> + <O_1O> + <OB> = n_0(x_2-x_1) + (n_1-n_0)(R-x_0) \quad (5)$$

and $<AP_1P_2B> = <AP_1> + <P_1P_2> + <P_2B>$ (6);

it is assumed herein that P1 is $(x_3,y_3,z_3)$, and P2 is $(0,y,z)$, and then it may be expressed as:

$$<AP_1P_2B> = n_0[(x_3-x_1)^2+y_3^2+z_3^2]^{1/2} + n_1[x_3^2+(y-y_3)^2+(z-z_3)^2]^{1/2} + n_0[x_2^2+(y_2-y)^2+z^2]^{1/2} \quad (7)$$

in addition, the $P_2$ point is located on a spherical surface, and then $$(x_3-x_1)^2 + y_3^2 + z_3^2 = R^2 \quad (8); \text{ and}$$

a light ray meets, at the $P_2$ point, the refraction law, that is, $$n_0 \sin \alpha_1 = n_1 \sin \alpha_2 \quad (9), \text{ and}$$

in addition, an incident ray, an emergent ray, and a normal line are on a same plane, and then:

$$(\overrightarrow{AP_1} \times \overrightarrow{P_1O_2}) \cdot \overrightarrow{P_1P_2} = 0 \quad (10),$$

wherein $\overrightarrow{AP_1}$ indicates an incident ray vector, $\overrightarrow{P_1O_2}$ indicates a surface normal line vector of a curved surface, and $\overrightarrow{P_1P_2}$ indicates a refracted ray vector.

In this way, an expression of the optical path difference function may be acquired.

In an optimized design, an approximate focusing location B (image point) may be calculated according to a set light source location A (object point) and by using a density of central grating lines of a grating as a benchmark; and the optical path difference function may be optimized by using the object point location and an approximate location of the image point as initial conditions of the optimization.

For the spherical surface grating, a design target of aberration elimination is to reduce a function value of the optical path difference function as far as possible within a range of y and z coordinates of a grating lens.

In some embodiments, a basis for a Fresnel surface to be equivalent to a curved surface is that when passing, at a same incident aperture angle, through the Fresnel surface and the curved surface, a same incidence point light source has a same location of image speckles and a same size of the image speckles.

With reference to the method mentioned in the foregoing, the following provides a preferred instance, to prove effectiveness of the method.

First, a Fresnel fixed-line-space plane grating structure is designed. Herein, a transmission-type structure is used, and 900 lines/mm is selected as a density of grating lines. A selected working wave band range is 500 nm to 700 nm. To optimize the Fresnel fixed-line-space plane grating structure, the algorithm mentioned in the foregoing is used herein, where a Fresnel surface is made equivalent to a spherical surface, and then an aberration is optimized according to a spherical surface varied-line-space grating structure. An effect of the varied-line-space grating structure is obtained according to a parameter after the optimization.

Comparison is performed before and after the optimization, and differences between resolutions of the two structures are shown in the following Table 1.

TABLE 1

Comparison between resolutions between the fixed-line-space grating structure and the varied-line-space grating structure

| Structure type | 500 nm | 550 nm | 600 nm | 650 nm | 700 nm |
|---|---|---|---|---|---|
| Fixed-line-space grating | 1 nm | 0.8 nm | 1 nm | 1.5 nm | 2.5 nm |
| Varied-line-space grating | 0.3 nm | 0.75 nm | 0.8 nm | 0.5 nm | 0.9 nm |

Figure 5:
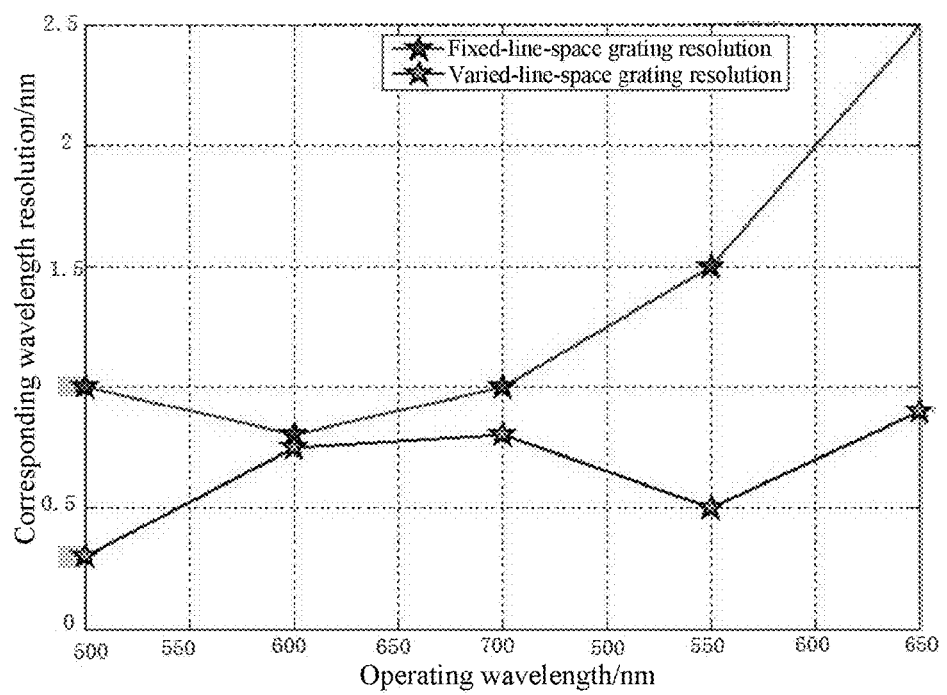
FIG. 5 is a diagram of comparison between optical system resolutions before and after optimization.

FIG. 5 provides a diagram of comparison between optical system resolutions before and after optimization.

According to the foregoing preferred instance, the effectiveness of the method is well proved.

Although the present application is described above in further detail through specific embodiments, the present application is not limited to the specific/preferred embodiments. It should be understood by persons of ordinary skill in the art that, they may further make several replacements or variations on the described implementation manners without departing from the spirit of the present application, and all these replacement or variation manners shall fall within the protection scope of the present application.

What is claimed is:

1. An optimized design method for manufacturing a Fresnel grating, comprising the following steps:
   (1) making a Fresnel surface type of the Fresnel grating equivalent to a curved surface type, and determining, based on the curved surface type to which the Fresnel surface type is equivalent, an optical path difference function of the Fresnel grating:

$$\Phi(\lambda) = <AP_1P_2B> - <AOB> + Nm\lambda$$

wherein an A point indicates an object point, a B point indicates an image point, an O point indicates a reference origin of the grating, $P_1$ is an incidence point, on a lens surface, of a light ray of the object point, $P_2$ indicates a point at which the light ray falls on the grating, $\lambda$ indicates a wavelength, m indicates a diffraction order, N indicates a grating line distribution function, and "< >" indicates an optical path corresponding to a route; and
   (2) determining a Fresnel grating parameter that minimizes a function value of the optical path difference function, so as to manufacture a Fresnel grating that has an aberration elimination effect.

2. The optimized design method for manufacturing a Fresnel grating according to claim 1, wherein the curved surface type equivalent to the Fresnel surface type is a spherical surface, and
   in step (1), an expression $\Phi(\lambda,x,y,z)$ of the optical path difference function of the Fresnel grating is determined according to the following formulas (4) to (10):
   a direction in which a grating surface is vertical to a grating line extending direction is set to a y direction, and a grating line quantity distribution function N(y) is:

$$N(y) = N_1y + N_2y^2 + N_3y^3 + N_4y^4 + \quad (4)$$

wherein $N_1$, $N_2$, $N_3$, $N_4$ and the like, are respectively coefficients of various orders, and a group of determined coefficients correspond to a varied-line-space grating pattern,
   it is set that the object point A is located at a main light ray of an XOY plane, coordinates of the object point A are $(x_1,0,0)$, the image point B is also located on the XOY plane, and coordinates of the image point B are $(x_2,y_2,0)$; and it is set that a spherical radius is R, coordinates of a sphere center $O_2$ are $(x_0,0,0)$, a refractive index inside a lens is $n_1$, and an air refractive index is $n_0$, $$<AOB>=<AO_1>+<O_1O>+<OB>=n_0(x_2-x_1)+(n_1-n_0)(R-x_0) \quad (5)$$

$$<AP_1P_2B>=<AP_1>+<P_1P_2>+<P_2B> \quad (6)$$

it is set that coordinates of P1 are $(x_3,y_3,z_3)$ and coordinates of P2 are $(0,y,z)$, and then $$<AP_1P_2B>=n_0[(x_3-x_1)^2+y_3^2+z_3^2]^{-1/2}+n_1[x_3^2+(y-y_3)^2+(z-z_3)^2]^{1/2}+n_0[x_2^2+(y_2-y)^2+z^2]^{1/2} \quad (7)$$

$$(x_3-x_1)^2+y_3^2+z_3^2=R^2 \quad (8)$$

$$n_0 \sin \alpha_1 = n_1 \sin \alpha_2 \quad (9)$$

$$(\overrightarrow{AP_1} \times \overrightarrow{P_1O_2}) \cdot \overrightarrow{P_1P_2}=0 \quad (10),$$

wherein it indicates that an incident ray, an emergent ray, and a normal line are on a same plane, wherein $\overrightarrow{AP_1}$ indicates an incident ray vector, $\overrightarrow{P_1O_2}$ indicates a surface normal line vector of a curved surface, and $\overrightarrow{P_1P_2}$ indicates a refracted ray vector.

3. The optimized design method for manufacturing a Fresnel grating according to claim 1, wherein the curved surface type equivalent to the Fresnel surface type is a spherical surface or a non-spherical surface.

4. The optimized design method for manufacturing a Fresnel grating according to claim 1, wherein the grating surface type of the Fresnel grating is a plane grating or a curved surface grating.

5. The optimized design method for manufacturing a Fresnel grating according to claim 1, wherein the grating surface type of the Fresnel grating is a fixed-line-space grating or a varied-line-space grating.

6. The optimized design method for manufacturing a Fresnel grating according to claim 1, wherein the Fresnel surface type of the Fresnel grating uses a concentric ring structure.

7. The optimized design method for manufacturing a Fresnel grating according to claim 1, wherein a basis for a Fresnel surface to be equivalent to a curved surface is that when passing, at a same incident aperture angle, through the Fresnel surface and the curved surface, a same incidence point light source has a same location of image speckles and a same size of the image speckles.

8. The optimized design method for manufacturing a Fresnel grating according to claim 1, wherein
in step (1), a location of the image point B is calculated according to a set location of the object point A and by using a density of central grating lines of the grating as a benchmark, and the optical path difference function is determined by using the location of the object point and the calculated location of the image point as initial conditions.

9. A method for manufacturing a Fresnel grating, comprising: manufacturing the Fresnel grating according to the parameters determined according to the optimized design method according to claim 1.

10. A Fresnel grating, wherein the Fresnel grating is manufactured according to the manufacturing method according to claim 9.

* * * * *